US008566216B1

(12) United States Patent
Topitzer et al.

(10) Patent No.: US 8,566,216 B1
(45) Date of Patent: Oct. 22, 2013

(54) SYSTEM AND METHOD FOR TRADING EXPOSURE CLEARING HOUSE

(75) Inventors: Gerald F. Topitzer, New York, NY (US); Cassio A. Calil, New York, NY (US); Ramaswamy S. Variankaval, West New York, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 89 days.

(21) Appl. No.: 12/025,268

(22) Filed: Feb. 4, 2008

Related U.S. Application Data

(60) Provisional application No. 60/915,907, filed on May 3, 2007.

(51) Int. Cl.
*G06Q 40/04* (2012.01)
*G06Q 20/00* (2012.01)
*G06Q 40/06* (2012.01)

(52) U.S. Cl.
CPC .............. *G06Q 40/04* (2013.01); *G06Q 20/00* (2013.01); *G06Q 40/06* (2013.01)
USPC ............................................ 705/37; 705/35

(58) Field of Classification Search
CPC ........ G06Q 40/04; G06Q 40/06; G06Q 20/00
USPC .................................................... 705/37, 35
See application file for complete search history.

(56) References Cited

U.S. PATENT DOCUMENTS

| | | | |
|---|---|---|---|
| 5,375,055 A * | 12/1994 | Togher et al. | 705/37 |
| 7,152,041 B2 * | 12/2006 | Salavadori et al. | 705/36 R |
| 7,197,483 B2 * | 3/2007 | Brady et al. | 705/37 |
| 7,398,242 B2 * | 7/2008 | Laederich et al. | 705/36 R |
| 7,409,367 B2 * | 8/2008 | McGill et al. | 705/37 |
| 7,533,054 B2 * | 5/2009 | Hausman et al. | 705/37 |
| 7,571,138 B2 | 8/2009 | Abassi et al. | |
| 7,596,523 B2 | 9/2009 | Aleskovski et al. | |
| 7,693,778 B2 | 4/2010 | Nafeh | |
| 7,702,563 B2 * | 4/2010 | Balson et al. | 705/37 |
| 7,840,464 B2 | 11/2010 | Coughlan et al. | |
| 7,840,468 B2 | 11/2010 | Coughlan et al. | |
| 7,890,398 B2 | 2/2011 | Abassi et al. | |
| 8,140,415 B2 | 3/2012 | Junnarkar et al. | |
| 8,285,625 B2 | 10/2012 | Freund | |
| 8,311,922 B2 | 11/2012 | Coughlan et al. | |
| 8,326,730 B2 | 12/2012 | Sweeney | |
| 8,332,298 B2 | 12/2012 | Mueller et al. | |
| 8,374,942 B2 | 2/2013 | Johnston et al. | |
| 2002/0099651 A1 * | 7/2002 | May | 705/38 |
| 2002/0138407 A1 | 9/2002 | Junnarkar et al. | |
| 2002/0138408 A1 | 9/2002 | Lawrence | |
| 2004/0143525 A1 * | 7/2004 | Nishimaki | 705/35 |
| 2004/0186806 A1 * | 9/2004 | Sinclair et al. | 705/37 |
| 2005/0044035 A1 * | 2/2005 | Scott | 705/37 |

(Continued)

*Primary Examiner* — Ella Colbert
*Assistant Examiner* — Scott S Trotter
(74) *Attorney, Agent, or Firm* — Goodwin Procter, LLP

(57) ABSTRACT

Aspects of the present invention are directed to a computer-implemented trading exposure management method and system for centrally managing trading exposures within an industry. The method may include receiving a client request for additional exposure capacity above a predetermined client exposure limit with respect to a particular counterparty and selecting a third party with available exposure capacity with respect to the particular counterparty. The method may additionally include transferring at least a portion of the selected third party's available exposure capacity with respect to the particular counterparty to the client.

15 Claims, 7 Drawing Sheets

(56) References Cited

U.S. PATENT DOCUMENTS

| | | |
|---|---|---|
| 2005/0114244 A1 | 5/2005 | Abassi et al. |
| 2005/0125341 A1* | 6/2005 | Miri et al. ............... 705/39 |
| 2006/0080216 A1* | 4/2006 | Hausman et al. .......... 705/37 |
| 2006/0149662 A1* | 7/2006 | Nordlicht et al. .......... 705/37 |
| 2007/0233594 A1 | 10/2007 | Nafeh |
| 2008/0071664 A1* | 3/2008 | Silverman et al. .......... 705/37 |
| 2008/0189221 A1 | 8/2008 | Coughlan et al. |
| 2008/0189222 A1 | 8/2008 | Coughlan et al. |
| 2008/0215388 A1 | 9/2008 | Abassi et al. |
| 2010/0036775 A1 | 2/2010 | Edens et al. |
| 2010/0185562 A1 | 7/2010 | Nafeh |
| 2011/0029456 A1 | 2/2011 | Coughlan et al. |
| 2012/0116954 A1 | 5/2012 | Junnarkar et al. |
| 2013/0054302 A1 | 2/2013 | Mueller et al. |

* cited by examiner

SYSTEM AND METHOD FOR TRADING EXPOSURE CLEARING HOUSE

PRIORITY

This application claims priority from provisional application Ser. No. 60/915,907, filed on May 3, 2007.

TECHNICAL FIELD

Embodiments of the invention are related generally to systems and methods for facilitating trading in the commodities markets, and, more particularly, to a system and method for implementing an exchange that allows trading parties to transfer or exchange credit exposure limits.

BACKGROUND OF THE INVENTION

Managing counterparty exposures in a trading environment has become increasingly complex and time-consuming for traders managing large portfolios of concentrated risk. In many industries, trading limits are often imposed on corporations with respect to various counterparties. For example, in the energy industry, oil, gas, and other energy related corporations often have trading limits with respect to other corporations in the energy industry. The trading limits are generally instituted by internal management policies of each corporation, but alternatively may be set by an industry governing board or a government agency. The trading limits ensure that a corporation will not have credit exposure to a counterparty exceeding a predetermined dollar amount. Accordingly, given the trading limit, if a counterparty is driven out of business or experiences losses, the losses of the trading partners are limited by their own internal trading limits.

The types of transactions between counterparties may involve derivative transactions such as futures, forwards, swaps, or the like, for various commodities like oil, gas, power, and others. For example, in the energy commodities market (oil, gas, power), parties will regularly enter into forwards whereby an amount of oil will be sold at a certain price for a certain amount of time. For example, an oil company may enter into oil forwards at a fixed price for the next five years with a counterparty. However, the oil company may have an exposure limit with respect to the counterparty so that if the counterparty dissolves, goes bankrupt, or otherwise becomes unavailable to fulfill it's obligations, the oil company's losses will be cemented by the exposure limit.

Often, corporations have a desire for highly correlated non-diversified exposures. In the example provided above, even though the oil company may have other trading partners, it may desire to exceed its trading limit with respect to the above-mentioned counterparty. For example, the oil company may have a trading limit of $10 million with respect to the counterparty. A situation may occur in which the oil company needs to take a position with respect to the counterparty which requires the oil company to exceed this $10 million credit limit. Depending on the internal policies or industry rules, the oil company will either be prohibited from taking this action or will be severely penalized by regulators for taking this action.

Existing solutions to this problem include requiring the traders to seek approval from internal management and/or to obtain insurance against the over-exposed position. In order to seek approval from internal management, the corporate investors may be required to consult a Board of Directors or predetermined officer to obtain permission to engage in a transaction that exceeds the normal restrictions. Management may require the traders to purchase insurance or a credit default swap (CDS). A CDS may refer to a bilateral contract between a protection buyer and a protection seller. The CDS will reference the creditworthiness of a third party and will relate to the specified debt obligations of the third party which fulfill certain pre-agreed characteristics. The protection buyer will pay a periodic fee to the protection seller in return for a contingent payment by the seller upon a credit event affecting the obligations of the reference entity specified in the transaction. The relevant credit events specified in a transaction will usually be selected from amongst the following: the bankruptcy of the reference entity; its failure to pay in relation to a covered obligation; it defaulting on an obligation or that obligation being accelerated; it agreeing to restructure a covered obligation or a repudiation or moratorium being declared over any covered obligation. Both insurance and CDS solutions can be prohibitively expensive.

Thus, taking large exposures to energy industry counterparties can be challenging due to internal counterparty credit limitations specific to counterparties, the desire for highly correlated non-diversified exposures, and lack of availability of low-cost and term specific hedges, which are investments that are designed to reduce or cancel out the risk in another investment. Lack of efficient solutions can lead to lost trades and profits for clients.

Accordingly, a solution is needed that facilitates trading between organizations within an industry while simultaneously avoiding the expenditures required for insuring against overexposure as well as the procedures required for seeking management approval for an over-exposed position.

BRIEF SUMMARY OF THE INVENTION

In one aspect of the invention, a computer-implemented trading exposure management method is provided for centrally managing trading exposures within an industry. The method may include receiving a client request for additional exposure capacity above a predetermined client exposure limit with respect to a particular counterparty and selecting a third party with available exposure capacity with respect to the particular counterparty. The method may additionally include transferring at least a portion of the selected third party's available exposure capacity with respect to the particular counterparty to the client.

In a further aspect of the invention, a trading exposure management system is provided for centrally managing trading exposures within an industry. The system may include client communication components for receiving a client request for additional exposure capacity with respect to a particular counterparty above a predetermined client exposure limit. The system may additionally include an exposure calculation engine for determining available third party excess exposure capacity with respect to the particular counterparty and an exposure transfer engine for transferring available third party exposure capacity with respect to the particular counterparty to a client requesting exposure capacity.

In yet an additional aspect of the invention, a computer-implemented trading exposure management method is provided for centrally managing trading exposures within an industry. The method includes receiving a client request for additional exposure capacity above a predetermined client exposure limit with respect to a particular counterparty, analyzing a client portfolio, and comparing the client portfolio to available third party exposure capacity. The method may additionally include selecting a third party with available exposure capacity with respect to the particular counterparty, and transferring at least a portion of the selected third party's available exposure capacity with respect to the particular counterparty to the client. The method may additionally include determining if residual client exposure exists with respect to the predetermined counterparty and offering a hedging product to hedge the residual exposure.

In yet an additional aspect of the invention, a computer-implemented trading exposure management method is provided for centrally managing trading exposures within an industry. The method may include receiving requests from multiple clients for additional exposure capacity above a predetermined client exposure limit with respect to multiple counterparties. The method may further include receiving requests from multiple third parties having additional exposure capacity with respect to the multiple counterparties, wherein the requests are for transfer of the additional exposure capacity. The method may additionally include matching the additional exposure capacities with the received requests from multiple clients and transferring the exposure capacity from the requesting multiple third parties to the multiple requesting clients.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a trading exposure management system that locates trading exposure needs of one party and matches them with excess trading exposure capability of another party, thereby attempting to utilize trading exposure capabilities to the fullest possible extent. For example, if one party has a trading exposure limit with respect to a counterparty and wants to exceed that trading exposure limit, a third party may have excess exposure capacity with respect to the same counterparty that it can transfer, for example, by trading, lending, or selling that exposure capacity. In some instances, for example, when the needs of one party cannot be matched with excess capabilities of another, the trading exposure management system may provide its own insurance or hedging products in order to assist a party in need of additional trading exposure.

Figure 1:
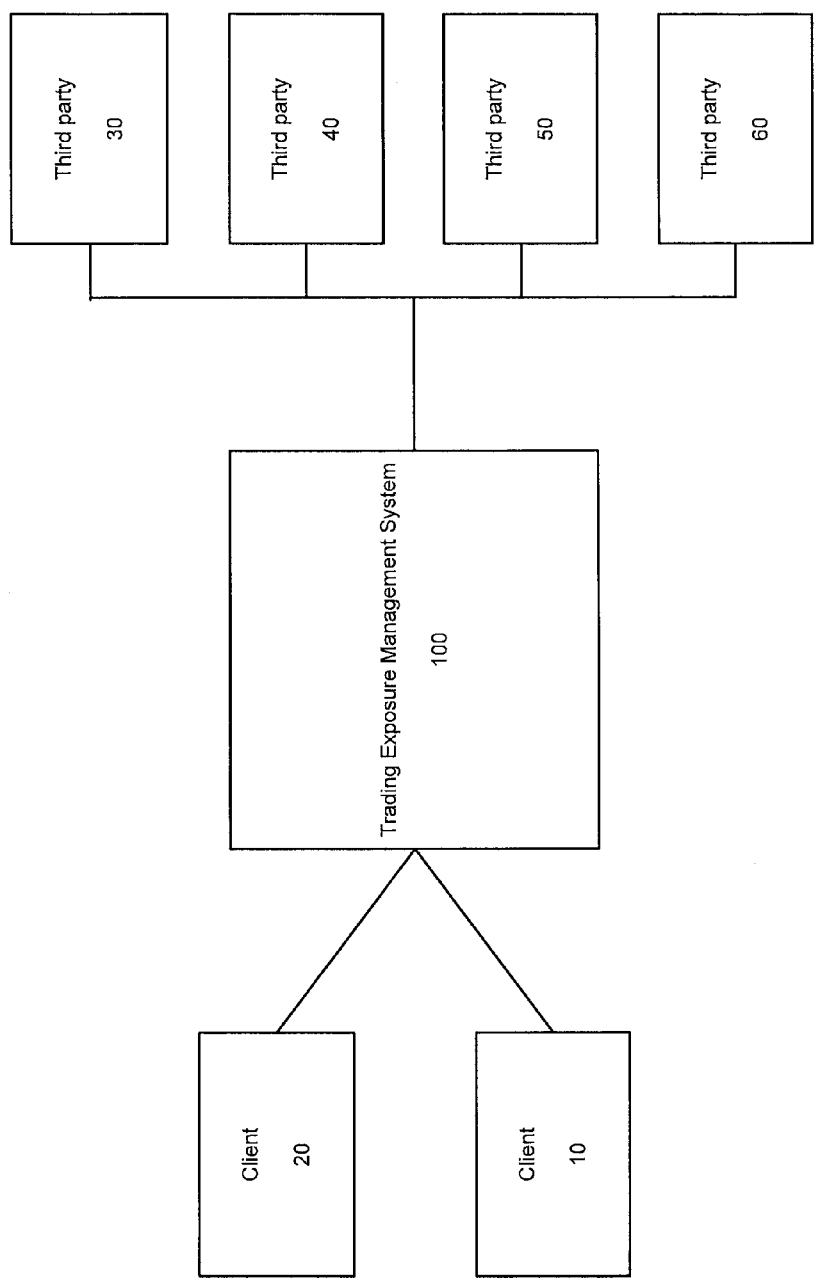
FIG. 1 is a block diagram illustrating an operating environment for a trading exposure management system in accordance with an embodiment of the invention.

FIG. 1 is a block diagram illustrating an operating environment for a trading exposure management system 100 in accordance with an embodiment of the invention. The trading exposure management system 100 preferably is capable operating both as a clearinghouse, which acts as a central counterparty, and as a trading partner for clients 10 and 20 and third parties 30, 40, 50, and 60.

The clients 10 and 20, and third parties 30, 40, 50, and 60 may in fact be trading partners operating within the same industry, such as the energy industry discussed above. In embodiments of the invention the clients 10 and 20 and third parties 30, 40, 50, and 60 may have identical systems and may all offer excess exposure capacity and request transfer of the exposure capacity of other trading partners. Through the use of the trading exposure management, a client may be able to enter into a potentially profitable transaction and does not have to seek expensive CDS or other credit protection hedging. The third party is thereby able to put to use and profit from its unused trading exposure limits, which qualify as a presently unused asset.

The trading exposure management system 100 essentially operates as a clearinghouse to optimize clients' overall trading counterparty exposure management by offering a hedge on outstanding counterparty exposure with third parties that have credit capacity and a hedge on net residual exposure by the trading exposure management system itself. The trading exposure management system 100 also offers client participants the opportunity to take new exposure for a fee utilizing existing excess credit limits. The notional of exposures may dynamically be matched with others and their outstanding credit capacity. Thus, the trading exposure management system may act as both a clearing house and a risk coverage provider for residual exposures. As will be further described below, the exact structure of the trade would be designed based on clients' and third parties' particular portfolio compositions.

All of the components shown in FIG. 1, including the trading exposure management system 100, the clients 10, 20, and the third parties 30, 40, 50, and 60. may be or include a computer system. The components may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/ output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The trading exposure management system 100 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 2:
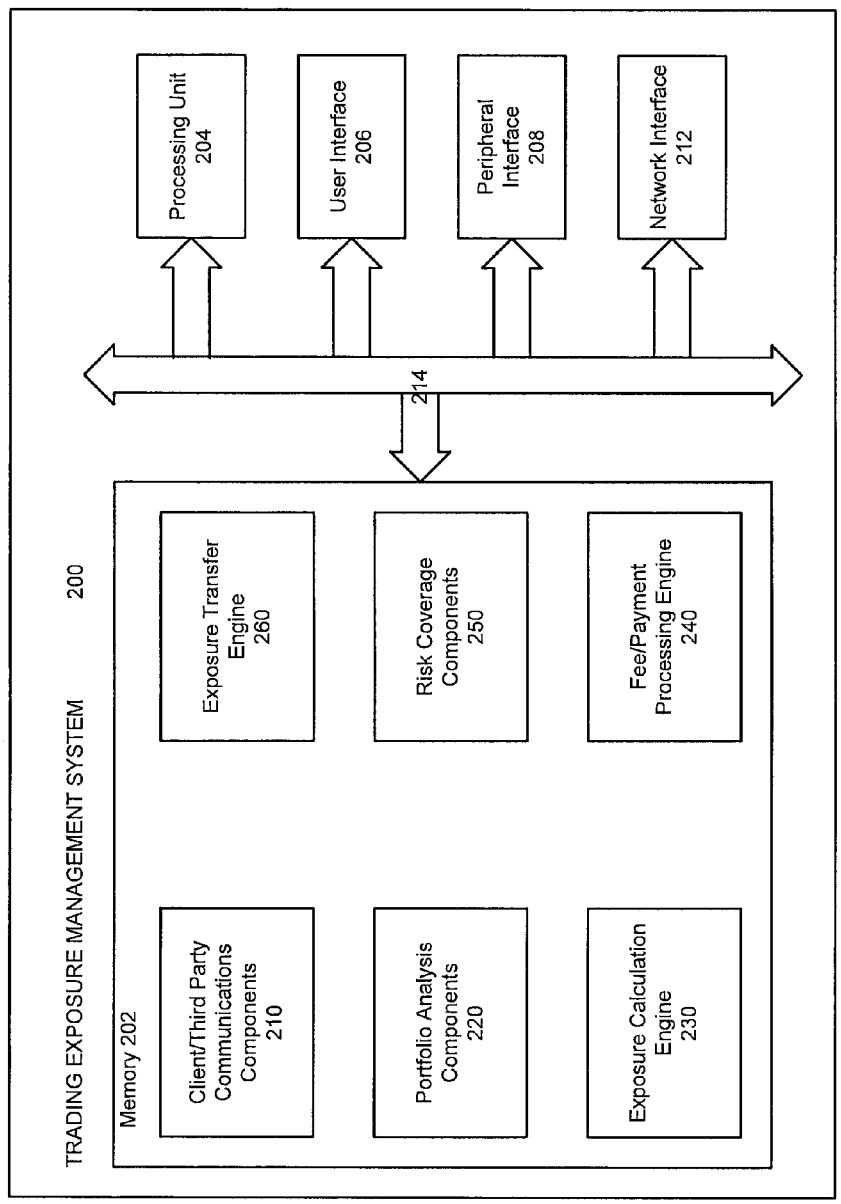
FIG. 2 is a block diagram illustrating a trading exposure management system in accordance with an embodiment of the invention.

FIG. 2 is a block diagram illustrating further details of a trading exposure management system 200 in accordance with an embodiment of the invention. The trading exposure management system 200 may include a memory 202 that stores multiple program and/or data modules. The memory 202 may be connected by a system bus 214 to a processing unit 204, a user interface 206, a peripheral interface 208, and a network interface 212. Other components may also be included.

The memory 202 may include client/third part communications components 210, portfolio analysis components 220, an exposure calculation engine 230, a fee payment/processing engine 240, risk coverage components 250, and an exposure transfer engine 260.

The portfolio analysis components 220 take into account information submitted by clients and third parties. The clients and third parties may provide the trading exposure management system 200 with a trading exposure information disclosure. The disclosure may provide client/third party preferences. The disclosure may also provide information such as portfolio details, including counterparties with ongoing trading activity (names client needs to hedge) and detailed information on each exposure (such as notional, tenor, underlying, commodity, etc). The client should also provide names of entities they are willing to offer coverage for to benefit the trading exposure management system 200.

The exposure calculation engine 230 matches exposure amounts and further determines whether residual exposures exist.

The fee payment/processing engine 240 processes fees submitted by clients and third parties. The fees may be set by a transparent price setting mechanism, based on CDS or public bond pricing benchmarks. When no benchmarks exist, the trading exposure management system 200 may provide a mechanism for participants to request and offer a bid.

The risk coverage components 250 may offer clients risk protection by operating as a trading partner or alternatively by offering coverage when residual exposures exist after a client has already received additional third party exposure. The risk coverage components 250 can hedge exposures using one of a number of available hedging products such as mezzanine hedges, whole hedges, or hybrid hedges.

Exposure transfer engine 260 transfers exposure capabilities between parties. The exposure transfer may take different forms including sale, loan, or trade. For instance, the system may facilitate an exchange whereby company A gives company B its excess exposure capacity for Company X. In exchange, company B gives company A its excess exposure capacity for Company Y. Through the exposure transfer engine 260, the system may attempt to ensure that all exposure capacity within an industry is utilized, thus promoting efficiency within the industry.

All of the above identified components could retain exposure limits as well as exposure transfers as confidential information, thereby providing a confidential intermediary for clients and third parties.

Figure 3:
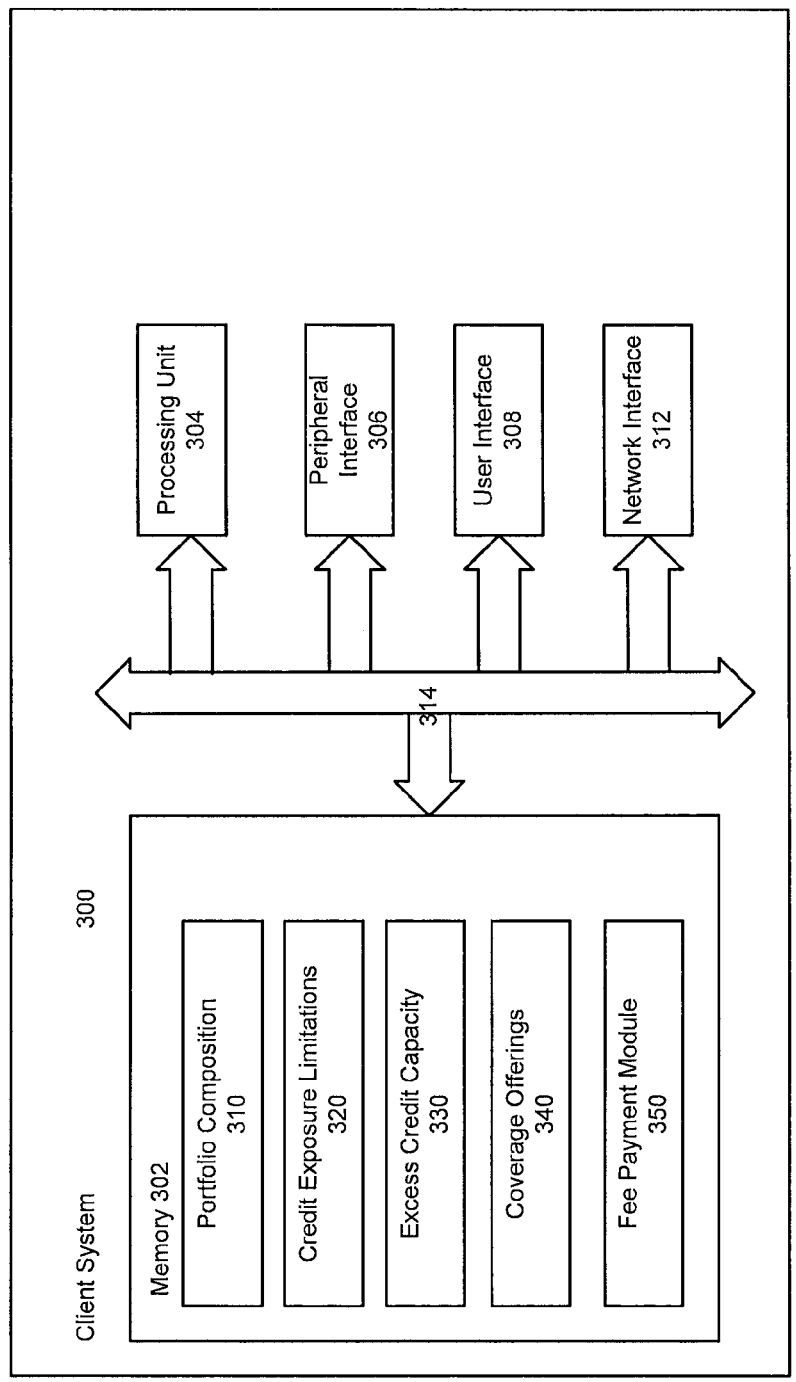
FIG. 3 is a block diagram illustrating a client system operating with a trading exposure management system in accordance with an embodiment of the invention.

FIG. 3 is a block diagram illustrating a client system 300 in accordance with an embodiment of the invention. The client system 300 may include a memory 302 that stores multiple program and/or data modules. The memory 302 may be connected by a system bus 314 to a processing unit 304, a user interface 306, a peripheral interface 308, and a network interface 312.

The memory 302 may include data modules such as a portfolio composition module 310, a credit exposure limitations component 320, excess credit capacity data 330, coverage offerings 340, and a fee payment module 350. These components transmit fees as well as all of the data described above as being processed by the trading exposure management system 200.

Figure 4:
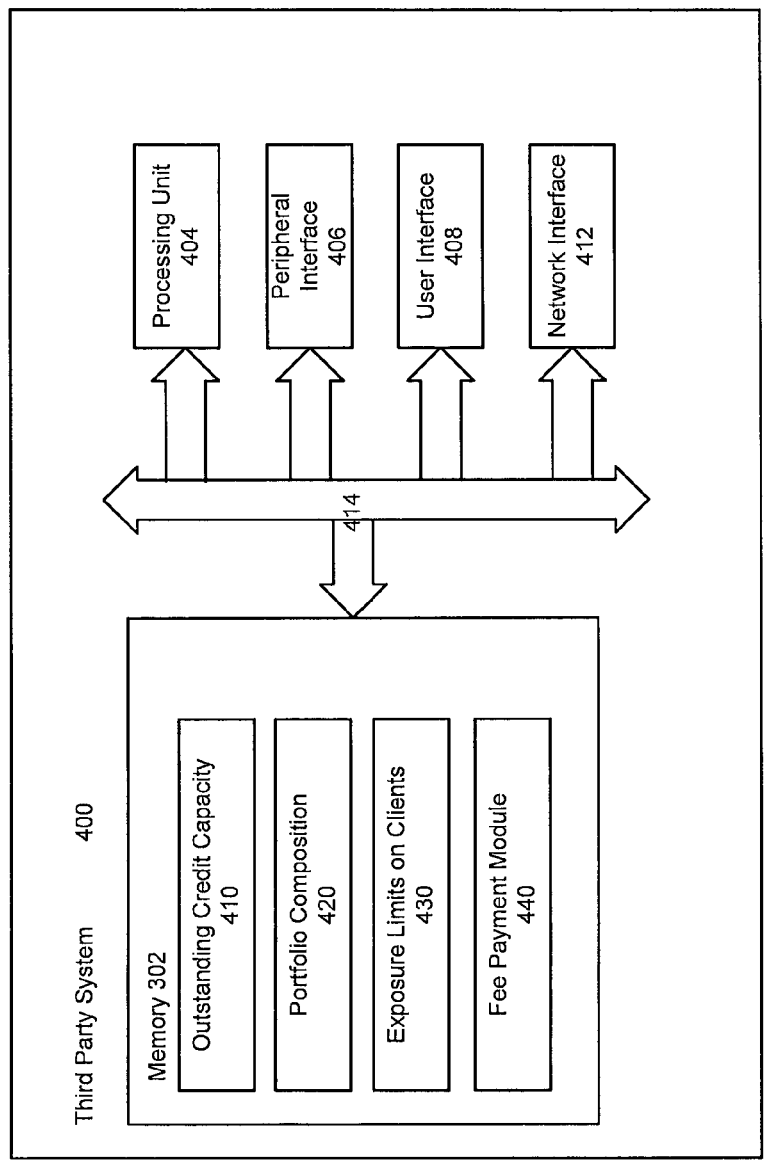
FIG. 4 is a block diagram illustrating a third party operating with a trading exposure management system in accordance with an embodiment of the invention.

FIG. 4 is a block diagram illustrating a third-party system 400 in accordance with an embodiment of the invention. The client system 400 may include a memory 402 that stores multiple program and/or data modules. The memory 402 may be connected by a system bus 414 to a processing unit 404, a user interface 406, a peripheral interface 408, and a network interface 412.

The memory 402 may include multiple data components such as an outstanding credit capacity data component 410, a portfolio composition data component 420, and exposure limits on clients 430. The memory 402 may also include a fee payment module 440.

In some instances, "client" may refer to only those traders seeking excess capacity and "third party" may refer only to those traders offering excess capacity. However, in embodiments of the invention, clients and third parties are equal participants that both seek and offer excess capacity.

Figure 5:
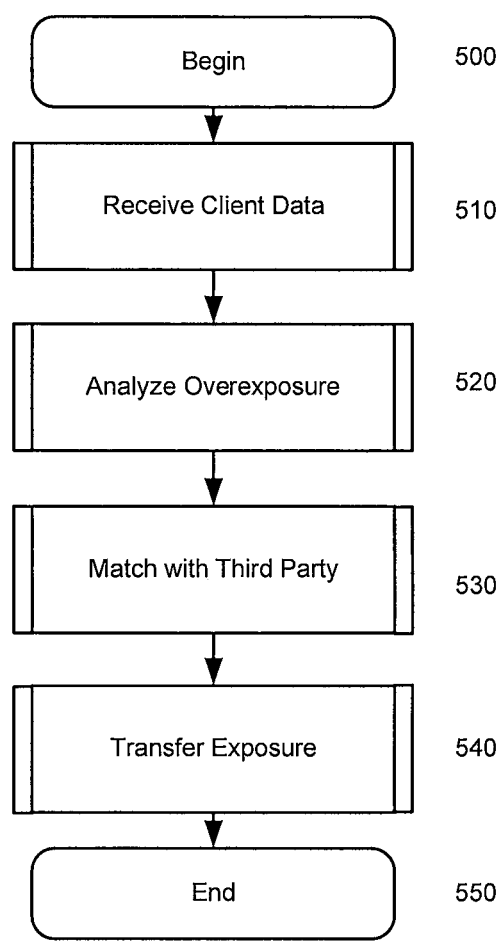
FIG. 5 is a flow chart illustrating a method of managing trading exposures in accordance with an embodiment of the invention.

FIG. 5 is a flowchart illustrating a method implemented by the trading exposure management system in accordance with an embodiment of the invention. The method begins in step 500. In procedure 510, the trading exposure management system receives client data, such as the data modules described above with reference to the client 300 in FIG. 3. In procedure 520, the trading exposure management system 200 analyzes the client's overexposures. This procedure may include an evaluation of the client's entire portfolio composition and analysis of client needs. For instance, the trading exposure management system takes a detailed view of pre-existing exposures and available exposure capacity and identifies the relevant market participants. In procedure 530, the trading exposure management system matches the client with a third party through an analysis of third party data along with a comparison between third party data and client needs. If a client has requested additional exposure with respect to a selected counterparty, and the system identifies a third party wanting to transfer excess exposure with respect to that counterparty, then the client will likely be matched with the third party. Multiple characteristics of participants may be considered in the matching process. For example, obligor identity, underlying product or type of exposure, tenor, amount of exposure, and product volume may be considered with respect to a counterparty. Furthermore, the existence of a long or short position may be significant in determining an appropriate match between participating parities.

In procedure 540, when a match is found, the trading exposure management system transfers the exposure from the client to the third party. Depending upon client and third party needs, the transfer executed may take the form of a loan, sale, or exchange. The process ends in step 550.

Figure 6:
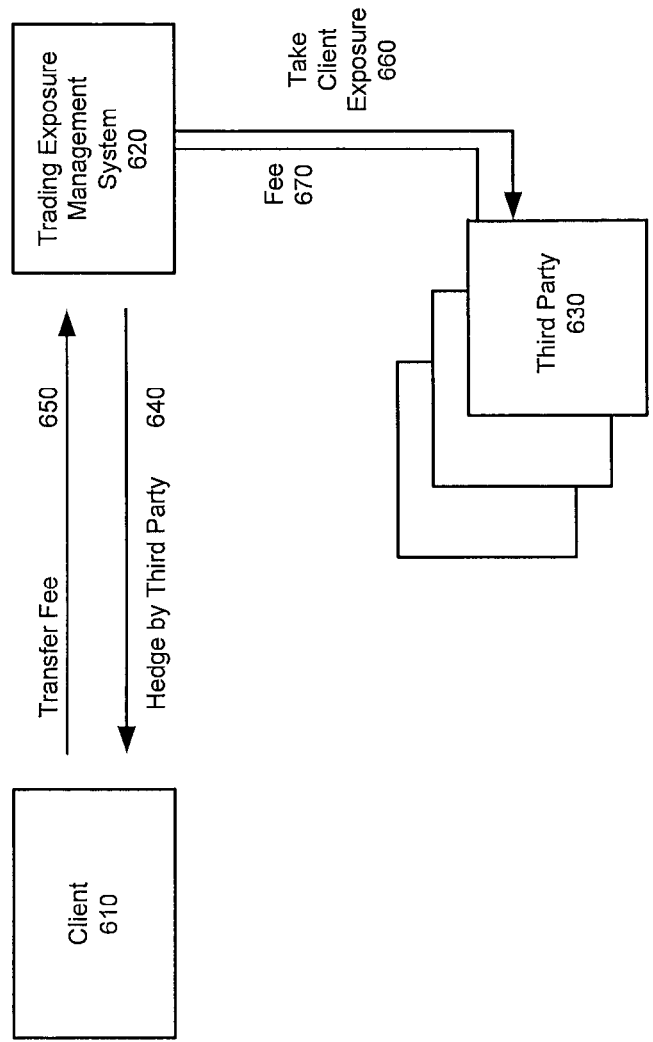
FIG. 6 is a diagram illustrating a clearinghouse embodiment of the trading exposure management system.

FIG. 6 is a diagram illustrating a clearinghouse application of the trading exposure management system in accordance with an embodiment of the invention. A trading exposure management system 620 interacts with a client 610 by receiving a transfer of a client fee at 650. The trading exposure management system 620 further interacts with the third party 630 by receiving a third party fee at 670 and allowing the third party 630 to take the client's exposure at 660, thus creating a hedge 640 by the third party 630. This interaction occurs substantially as described above with respect to FIG. 5.

Figure 7:
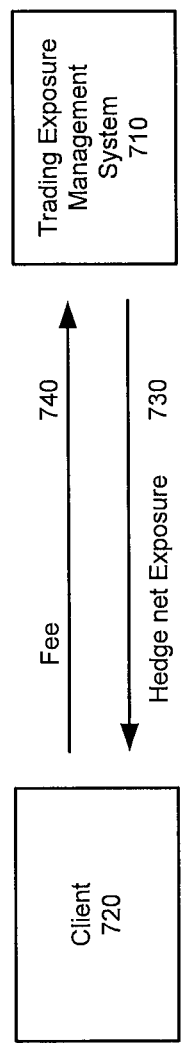
FIG. 7 is a diagram illustrating a trading partner embodiment of the trading exposure management system.

FIG. 7 is a diagram illustrating a trading partner application of the trading exposure management system in accordance with an embodiment of the invention. A trading exposure management system 710 interacts with a client 720 by accepting a fee at 740 and hedging the client's net exposure at 730. Thus instead of matching the client 720 with a third party, the trading exposure management system 710 itself acts a trading partner. In this instance, the trading exposure management system 710 may be connected with multiple clients and further may, in some instances, only operate as a trading partner after failing to locate available third party trading exposure capacity.

According to the invention, trading partners can lend or transfer their excess trading exposure capacity with respect to a particular counterparty to other trading partners who would otherwise exceed their trading limit maximums. A benefit of the invention is that a client is given exposure or protection to enter into a trade that otherwise could not be made, or that could not be made without expensive credit default swap (CDS) or other hedge protection. The benefit to the third party is that excess credit exposure that is otherwise fallow or unused is implemented to generate income. Thus, the third party is putting to use and profiting from its excess trading capacity, which is a presently unused asset Thus, the trading exposure management system enables creation of a market for unused capacity. Industry participants are buying and selling in order to make use of all available capacity. In effect, the trading exposure management system ensures that the industry is close to using all of its capacity all of the time.

Furthermore, through a two-way credit trading arrangement, the client can lower average cost by simultaneously hedging outstanding exposures and taking additional exposures that matches client's needs. Optimizing credit management requirements across the industry or in a given commodity/network of counterparties can minimize undesired collateral requirements and optimize capital structures. Under the proposed solution, the trading exposure management system would find third party program participants that are interested in taking a client's exposure. If there are residual net exposures after third party involvement, the trading and exposure management system can hedge the exposures using one of a number of available hedging products such as mezzanine hedges, whole hedges, or hybrid hedges. The trading exposure management system described herein arranges for a transfer of risk and manages operational aspects for program participants.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented trading risk exposure management method implementing a trading risk exposure management system including at least a processing unit and a memory, the method for centrally managing trading exposures within an industry, the method comprising:
   receiving a client request from a requesting client at the trading risk exposure management system for additional counterparty trading risk exposure capacity above a predetermined client counterparty trading risk exposure limit with respect to a particular counterparty;
   determining whether the requesting client needs additional risk exposure capacity, the determining accomplished using an exposure calculation engine implemented by the processing unit of the trading risk exposure management system;
   selecting a third party with available counterparty trading risk exposure capacity with respect to the particular counterparty, the selection accomplished using a trading risk exposure calculation engine implemented by the processing unit of the trading risk exposure management system;
   the trading risk exposure calculation engine analyzing the trading portfolio of the third party, including the third party's counterparty trading risk exposure limit for the particular counterparty so as to determine if the third party has counterparty trading risk exposure available to the requesting client;
   determining a distribution of at least a portion of the available counterparty trading risk exposure capacity of the third party with respect to the particular counterparty between the requesting client and selected third party; and
   transferring at least a portion of the available counterparty trading risk exposure capacity of the third party with respect to the particular counterparty to the requesting client in order to provide the requesting client with the additional counterparty trading risk exposure capacity above the predetermined client counterparty trading risk exposure limit with respect to the particular counterparty.

2. The method of claim 1 further comprising receiving a fee from the requesting client in exchange for the transfer.

3. The method of claim 1, further comprising receiving a fee from the third party for performing the transfer.

4. The method of claim 1, further comprising providing the additional exposure capacity requested by the client.

5. The method of claim 1, wherein transferring the available risk exposure capacity comprises one of selling, lending, and trading the exposure capacity.

6. The method of claim 1, further comprising analyzing a trading portfolio of the requesting client, analyzing a third party trading portfolio, and matching the requesting client with an owner of the third party portfolio based on the analyses.

7. The method of claim 1, further comprising transferring excess trading exposure of the requesting client with respect to a different counterparty to another entity requesting additional credit exposure capacity.

8. The method of claim 1, further comprising:
   receiving requests from multiple clients for additional risk exposure capacity above the predetermined client risk exposure limit with respect to multiple counterparties;
   receiving requests from multiple third parties having additional risk exposure capacity with respect to the multiple counterparties, the requests for transferring the additional risk exposure capacity to selected requesting clients;
   matching the additional risk exposure capacities with the received requests from multiple clients; and
   transferring at least a portion of the additional risk exposure capacities from the requesting multiple third parties to the multiple requesting clients.

9. The method of claim 8, further comprising determining if residual client exposure exists with respect to the multiple counterparties and offering a hedging product to hedge the residual exposure.

10. A trading risk exposure management system including at least a processing unit and a memory, the trading risk exposure management system for centrally managing trading risk exposures within an industry, the system comprising:

client communication components for receiving a client request from a requesting client for additional counterparty trading risk exposure capacity with respect to a particular counterparty above a predetermined client counterparty trading risk exposure limit;

an exposure calculation engine implemented by the processing unit for determining available third party excess counterparty risk trading exposure capacity with respect to the particular counterparty, the trading risk exposure calculation engine analyzing the trading portfolio of the third party, including the third party's counterparty trading risk exposure limit for the particular counterparty so as to determine if the third party has counterparty trading risk exposure available to the requesting client; and an exposure transfer engine for transferring the available third party counterparty trading risk exposure capacity with respect to the particular counterparty to the requesting client in order to provide the requesting client with the additional counterparty trading risk exposure capacity above the predetermined client counterparty trading exposure limit with respect to the particular counterparty, and for distributing the available third party counterparty trading risk exposure capacity with respect to the particular counterparty between the requesting client and the third party.

11. The system of claim 10, further comprising portfolio analysis components for analyzing a client portfolio and third party portfolios.

12. The system of claim 10, further comprising third party communications components for receiving and processing third party requests to provide trading exposure coverage.

13. The system of claim 10, further comprising risk coverage components for covering risk in the event of residual net exposures.

14. The system of claim 10, further comprising a fee payment processing engine for processing fees from requesting clients and third parties.

15. The system of claim 10, wherein transferring comprises one of selling, lending, and trading the available exposure capacity.

* * * * *